(12) United States Patent
Deo et al.

(10) Patent No.: US 9,565,870 B2
(45) Date of Patent: Feb. 14, 2017

(54) DISPENSING NOZZLE WITH AN ULTRASOUND ACTIVATOR

(71) Applicant: PepsiCo, Inc., Purchase, NY (US)

(72) Inventors: Indrani Deo, Ossing, NY (US); Dmitry Falkov, St. Petersburg (RU); Vladmir Yakovkin, St. Petersburg (RU); Georgy Martsinovskiy, St. Petersburg (RU)

(73) Assignee: PepsiCo, Inc., Purchase, NY (US)

( * ) Notice: Subject to any disclaimer, the term of this patent is extended or adjusted under 35 U.S.C. 154(b) by 0 days.

(21) Appl. No.: 13/664,628

(22) Filed: Oct. 31, 2012

(65) Prior Publication Data

US 2013/0108748 A1 May 2, 2013

Related U.S. Application Data

(60) Provisional application No. 61/554,299, filed on Nov. 1, 2011.

(51) Int. Cl.
*B05B 1/08* (2006.01)
*A23L 1/025* (2006.01)
*B05B 17/06* (2006.01)

(52) U.S. Cl.
CPC ............... *A23L 1/0252* (2013.01); *A23L 5/32* (2016.08); *B05B 17/063* (2013.01)

(58) Field of Classification Search
CPC ......... A23L 1/0252; A23L 5/32; B05B 17/063

(Continued)

(56) References Cited

U.S. PATENT DOCUMENTS 3,121,534 A * 2/1964 Wilson ............... B05B 17/0623
                                                      239/102.2
3,746,257 A * 7/1973 Broad et al. .............. 239/102.2
(Continued)

FOREIGN PATENT DOCUMENTS

DE          100 56 581 A1    4/2003
DE     10 2007 056 571 A1    6/2009
(Continued)

OTHER PUBLICATIONS

International Search Report and Written Opinion in corresponding PCT Application No. PCT/US2012/062842, mailed Feb. 19, 2013.

*Primary Examiner* — Arthur O Hall
*Assistant Examiner* — Joel Zhou
(74) *Attorney, Agent, or Firm* — Sterne, Kessler, Goldstein & Fox P.L.L.C.

(57) ABSTRACT

A dispensing nozzle comprising an ultrasound emitter is disclosed. A wall of the ultrasound emitter defines a channel. The ultrasound emitter comprises an inlet, a top and a bottom. The bottom of the ultrasound emitter may comprise a conical outlet. The conical outlet comprises an outer diameter that decreases in size in a direction towards an outlet opening defined by the conical outlet. The channel may extend from the inlet to the conical outlet. The dispensing nozzle further comprises a tube. The tube may be configured to deliver free-flowing material to the inlet. The ultrasound emitter may be configured to deliver ultrasound waves to free-flowing material flowing through channel. The ultrasound emitter may be configured to induce cavitation in free-flowing material passing through the conical outlet. The cavitation may be sufficient to destroy microorganisms and reduce microbial contamination of the free-flowing material dispensed from the dispensing nozzle.

18 Claims, 1 Drawing Sheet

(58) Field of Classification Search
USPC .................. 239/102.02; 426/238; 222/190
See application file for complete search history.

(56) References Cited

U.S. PATENT DOCUMENTS

| | | | |
|---|---|---|---|
| 3,812,854 A * | 5/1974 | Michaels | A61M 15/0085 |
| | | | 128/200.16 |
| 4,153,201 A * | 5/1979 | Berger | B05B 17/0623 |
| | | | 239/102.2 |
| 4,322,291 A | 3/1982 | Ho | |
| 4,496,101 A * | 1/1985 | Northman | F02M 69/041 |
| | | | 239/102.2 |
| 4,757,921 A | 7/1988 | Snowball | |
| 4,867,052 A | 9/1989 | Cipelletti | |
| 4,969,991 A | 11/1990 | Valadez | |
| 5,064,097 A | 11/1991 | Brog et al. | |
| 5,316,673 A | 5/1994 | Kohlmann et al. | |
| 5,339,874 A | 8/1994 | Cragun | |
| 5,450,882 A | 9/1995 | Cragun | |
| 5,484,538 A | 1/1996 | Woodward | |
| 6,077,427 A | 6/2000 | Burrows | |
| 6,216,918 B1 | 4/2001 | Saveliev et al. | |
| 6,354,341 B1 | 3/2002 | Saveliev et al. | |
| 6,382,467 B2 | 5/2002 | Saveliev et al. | |
| 6,449,970 B1 | 9/2002 | Gagliano | |
| 6,483,119 B1 | 11/2002 | Baus | |
| 6,521,067 B1 * | 2/2003 | Clark | B05B 17/0623 |
| | | | 156/290 |
| 6,695,168 B2 | 2/2004 | Pinedjian et al. | |
| 7,018,546 B2 | 3/2006 | Kurihara et al. | |
| 7,846,341 B2 | 12/2010 | Babaev | |
| 7,883,032 B2 * | 2/2011 | Davies et al. | 239/690 |
| 2001/0010318 A1 | 8/2001 | Saveliev et al. | |
| 2002/0156400 A1 | 10/2002 | Babaev | |
| 2005/0008739 A1 * | 1/2005 | Talukdar et al. | 426/238 |
| 2005/0247614 A1 * | 11/2005 | Wiemer et al. | 210/198.1 |
| 2006/0175352 A1 | 8/2006 | Emmendorfer et al. | |
| 2007/0137726 A1 | 6/2007 | Yan | |
| 2008/0054091 A1 * | 3/2008 | Babaev | B01F 3/08 |
| | | | 239/102.2 |
| 2008/0142037 A1 | 6/2008 | Dempski et al. | |
| 2009/0224066 A1 | 9/2009 | Riemer | |
| 2010/0101929 A1 | 4/2010 | Kamen et al. | |
| 2010/0176147 A1 | 7/2010 | Segers | |
| 2010/0247374 A1 | 9/2010 | Pellet | |
| 2010/0276510 A1 * | 11/2010 | Setoguchi | 239/102.2 |
| 2010/0324481 A1 | 12/2010 | Babaev | |

FOREIGN PATENT DOCUMENTS

| | | | | |
|---|---|---|---|---|
| FR | 1 021 973 A | | 2/1953 | |
| GB | 2385291 | * | 8/2003 | B05B 1/02 |
| WO | 98/01394 A1 | | 1/1998 | |
| WO | 02/064173 A1 | | 8/2002 | |
| WO | 2007 021427 A2 | | 2/2007 | |
| WO | 2007/143971 A2 | | 12/2007 | |
| WO | 2010/062789 A1 | | 6/2010 | |

* cited by examiner

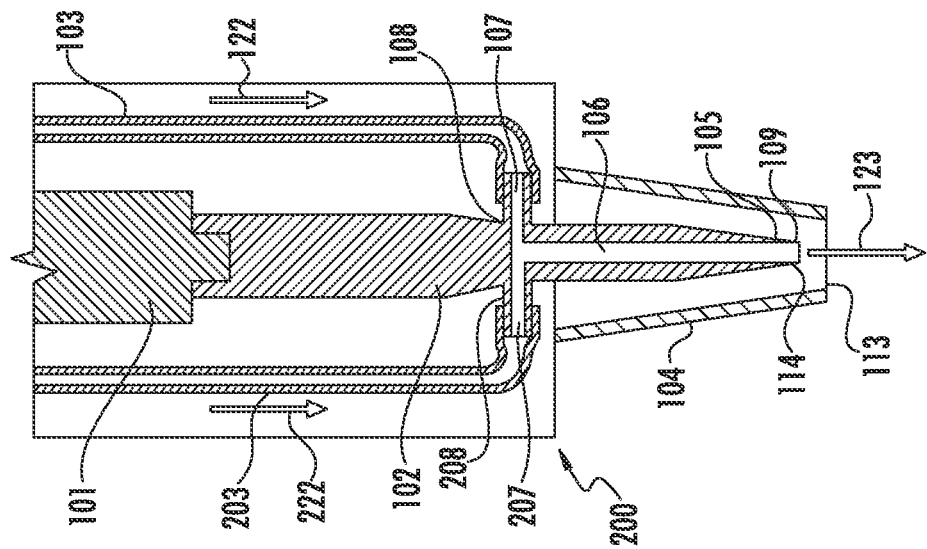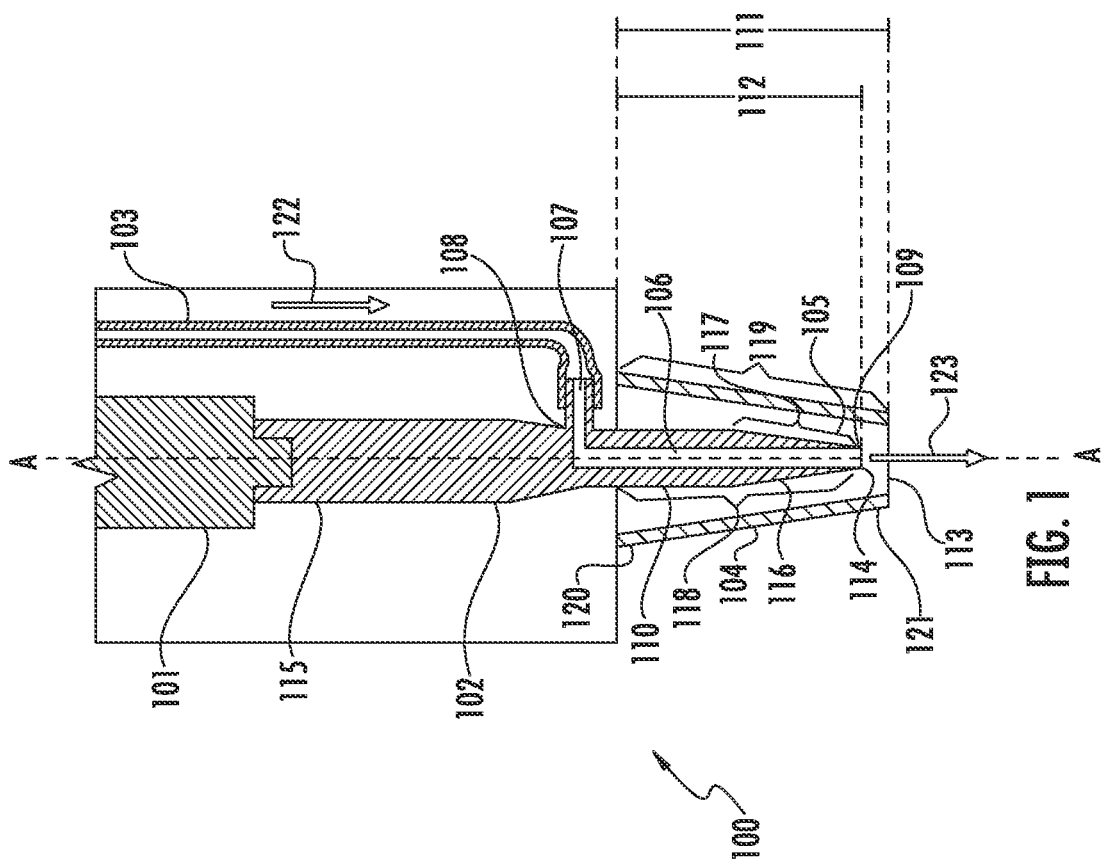

DISPENSING NOZZLE WITH AN ULTRASOUND ACTIVATOR

CROSS REFERENCE TO RELATED APPLICATIONS

This application is a non-provisional of and claims priority to provisional U.S. Application No. 61/554,299, filed Nov. 1, 2011, and entitled "Dispensing Nozzle with an Ultrasound Activator," the entire disclosure of which is hereby incorporated by reference in its entirety and for all purposes.

FIELD OF THE INVENTION

This disclosure relates generally to a dispensing nozzle with an ultrasound activator for dispensers of free-flowing materials, e.g., free-flowing food dispensers, such as beverage dispensers for cafeterias, restaurants (including fast food restaurants), theatres, convenience stores, gas stations, and other entertainment and/or food service venues.

BACKGROUND

Use of ultrasound for pasteurization and sterilization of liquids is known. For example, in an existing method ultrasonic waves are emitted into a fluid with the goal of sterilizing the fluid, and killing and inactivating organisms within the fluid. In existing methods, ultrasonic waves are typically emitted into the laminar flow of the treated liquid, with an ultrasound transducer being mounted on a tank wall, where the laminar flow is arranged.

However, use of ultrasound treatment of fluids for their sterilization or pasteurization inside a dispenser nozzle presents different challenges than those addressed by existing apparatuses and methods. It would be desirable to achieve high efficiency of cavitation excitation in a liquid flow and a more compact design so that ultrasound treatment of fluids can be used for sterilization or pasteurization inside a dispenser nozzle.

SUMMARY

In one aspect of the disclosure a dispensing nozzle comprising an ultrasound emitter is provided. The ultrasound emitter includes a wall, wherein the wall defines a channel. The ultrasound emitter further includes an inlet at a side of the ultrasound emitter. The ultrasound emitter comprises a top and a bottom, wherein the bottom of the ultrasound emitter has a conical outlet. In an embodiment, the conical outlet has an outer diameter that decreases in size in a direction towards an outlet opening defined by the conical outlet. The channel extends from the inlet to the conical outlet. The dispensing nozzle further comprises a tube, the tube configured to deliver free-flowing material to the inlet of the ultrasound emitter. The ultrasound emitter is configured to deliver ultrasound waves to the free-flowing material flowing through channel.

The above and other aspects, features and advantages of the present disclosure will be apparent from the following detailed description of the illustrated embodiments thereof which are to be read in connection with the accompanying drawings.

BRIEF DESCRIPTION OF THE DRAWINGS

FIG. 1 shows a dispensing nozzle in accordance with aspects of the disclosure.

FIG. 2 shows a dispensing nozzle in accordance with aspects of the disclosure.

DETAILED DESCRIPTION

An aseptic nozzle with an ultrasound applicator or emitter for a dispenser for a free-flowing material is disclosed in various embodiments of the disclosure. The disclosure provides a compact design that can be integrated within a dispenser nozzle and high efficiency of cavitation excitation in the free-flowing material to significantly reduce bacteria contamination of the dispensed product. The free-flowing material may be any material that freely flows, and thus comprises free-flowing foods, including but not limited to beverages and beverage components.

In order to eliminate potential risk of bacterial contamination of a beverage in a beverage dispenser, a nozzle with an integrated ultrasound emitter is provided. Bacterial contamination may result either from inherent contamination of the beverage component(s) or from the contamination in the inner volume of the dispensing machine.

FIG. 1 illustrates an embodiment of a dispensing nozzle 100 in accordance with aspects of the disclosure. The dispensing nozzle 100 comprises an integrated ultrasound emitter 102. In an embodiment, a suitable magnetostriction-based or piezoelectric ultrasound transducer 101 generates ultrasonic waves, and is coupled to ultrasound emitter 102. The ultrasound emitter 102 may be attached to the transducer 101 by a suitable mount, e.g., a thread mount. The ultrasound emitter 102 may define a channel 106. The ultrasound emitter 102 may comprise a top portion 115 and a bottom portion 116. The ultrasound emitter 102 may have a side 108 that may have an inlet 107. The ultrasound emitter 102 may have a conical outlet 105. The conical outlet 105 may have an outer diameter that decreases in size in a direction towards an outlet opening 114 defined by the conical outlet 105. In an embodiment, the channel 106 may extend from the inlet 107 to the conical outlet 105. As shown in FIG. 1, the flow of a free-flowing material or liquid through inlet 107 may be substantially perpendicular to the flow of free-flowing material through conical outlet 105. The inlet 107 may be connected to tube 103. Tube 103 may guide the free-flowing material, e.g., a beverage or beverage component, which is prepared and treated with ultrasound waves in the dispenser nozzle 100. The position of the inlet 107 on the emitter 102 may be at the node of the ultrasound waves, which are excited in the emitter 102 by transducer 101. At this position, i.e., the node of the ultrasound waves, the ultrasound amplitude may be at its minimum, and thus, the mechanical effect on the inlet structure of inlet 107 may be minimized. Contrastingly, conical outlet 105 may be positioned at the anti-node of the ultrasound waves, where the ultrasound amplitude may be at its maximum.

In an aspect of the disclosure, channel 106 may have a substantially uniform diameter. In an embodiment, ultrasound emitter 102 may have a wall 110, the wall 110 comprising a portion 117 wherein the thickness of the portion 117 reduces in a direction towards the outlet edge 109 of conical outlet 105 to increase the mechanical activation of the beverage flow. At conical outlet 105, cavitation in the passing flow may be induced. The cavitation may lead to physical destruction of microorganisms, thus reducing microbial contamination of the dispensed beverage.

A protective collar 104 may be provided to reduce ability of a consumer to touch conical outlet 105 of ultrasound emitter 102 by hand, as well as to prevent a beverage cup or glass from touching conical outlet 105, thereby avoiding contamination of conical outlet 105 and to shield the consumer from ultrasound energy. The protective collar 104 may comprise a longitudinal length 111 that is greater than a longitudinal length 112 of section 118 of wall 110. Protective collar 104 may have at least a portion 119 having a conical shape. As shown in FIG. 1, portion 119 of protective collar 104 may have an upper section 120 and a lower section 121. The portion 119 of protective collar 104 may taper from the upper section 120 to the lower section 121.

Protective collar 104 may define an opening 113 positioned underneath and aligned with opening 114 of the conical outlet 105.

Arrow 122 shows the direction of flow of a free-flowing material or liquid through tube 103. Arrow 123 shows the direction of flow of a free-flowing material or liquid exiting outlet opening 114 defined by the conical outlet 105.

Another embodiment of the disclosure is shown in FIG. 2. The embodiment shown in FIG. 2 comprises a dispensing nozzle 200, which may be configured to deliver more than one beverage or beverage components. Dispensing nozzle 200 may comprise the same structure as the dispensing nozzle 100 shown in FIG. 1, with the addition of at least one additional tube 203, and an inlet 207 corresponding to tube 203 and positioned at side 208 of emitter 102. Tube 203 may be placed at nodes of the ultrasound waves excited in the emitter 102, as shown in FIG. 2. As shown, axis A-A runs longitudinally along ultrasound emitter 201, and inlet 207 may be positioned substantially 180 degrees from inlet 107 about axis A-A.

In accordance with the present disclosure, those of ordinary skill in the art will recognize that the dispensing nozzle 200 may be configured to deliver a number of different beverages and/or beverage components at different times as may be desired. For example, dispensing nozzle 200 may be configured to receive a first beverage from tube 103, subject the first beverage to ultrasound treatment by the emitter 102, and deliver the treated first beverage into a first cup or glass placed under dispensing nozzle 200. At a later time, dispensing nozzle 200 may receive a second beverage from tube 203, subject the second beverage to ultrasound treatment by emitter 102, and deliver the treated second beverage into a second cup or glass placed under dispensing nozzle 200.

Those of ordinary skill in the art will recognize that in accordance with the present disclosure, the dispensing nozzle 200 may be configured receive a first beverage component from tube 103 and receive a second beverage component from tube 203 at the same time or relatively the same time to be mixed with the first beverage component in dispensing nozzle 200, subject the first and second beverage components to ultrasound treatment at the same time or relatively same time, and deliver the treated first and second components into a cup or glass placed under dispensing nozzle 200 at the same time or relatively same time. In this embodiment, multiple inlets may deliver different beverage components, and these different beverage components may be mixed as they pass through nozzle 200. In this embodiment, applied ultrasound excitation provided by emitter 102 may provide increased mixing of the components than without the applied ultrasound excitation provided by emitter 102.

Arrow 122 shows the direction of flow of a free-flowing material or liquid through tube 103. Arrow 222 shows the direction of flow of a free-flowing material or liquid through tube 203. Arrow 123 shows the direction of flow of a free-flowing material or liquid exiting outlet opening 114 defined by the conical outlet 105.

In an aspect of the disclosure, a dispensing nozzle comprising an ultrasound emitter is provided. The ultrasound emitter may include a wall, wherein the wall defines a channel. The ultrasound emitter may further include an inlet at a side of the ultrasound emitter. The ultrasound emitter may also have a top and a bottom, wherein the bottom of the ultrasound emitter has a conical outlet. In an embodiment, the conical outlet may have an outer diameter that decreases in size in a direction towards an outlet opening defined by the conical outlet. The channel may extend from the inlet to the conical outlet. The dispensing nozzle may further comprise a tube, the tube configured to deliver free-flowing material to the inlet of the ultrasound emitter. The ultrasound emitter may be configured to deliver ultrasound waves to the free-flowing material flowing through channel.

In a further aspect of the disclosure, the dispensing nozzle may comprise an ultrasound transducer. The ultrasound transducer may be configured to generate ultrasound waves. The ultrasound transducer may be coupled to the ultrasound emitter.

In a further aspect of the disclosure, the ultrasound transducer may be selected from the group consisting of a magnetostriction-based transducer and a piezoelectric ultrasound transducer.

In a further aspect of the disclosure, an opening defined by the inlet of the ultrasound emitter may be provided, wherein the opening is substantially perpendicular to an opening defined by the conical outlet of the ultrasound emitter.

In a further aspect of the disclosure, the inlet of the ultrasound emitter may be placed at a position that corresponds to a node of ultrasound waves delivered by the ultrasound emitter.

In a further aspect of the disclosure, the conical outlet of the ultrasound emitter may be placed at a position that corresponds to an anti-node of ultrasound waves delivered by the ultrasound emitter.

In a further aspect of the disclosure, the inlet of the ultrasound emitter is placed at a position that corresponds to a node of ultrasound waves delivered by the ultrasound emitter, and wherein the conical outlet of the ultrasound emitter is placed at a position that corresponds to an anti-node of ultrasound waves delivered by the ultrasound emitter.

In a further aspect of the disclosure, the ultrasound emitter may be configured to induce cavitation in a free-flowing material passing through the conical outlet, the cavitation sufficient to destroy microorganisms and reduce microbial contamination of the free-flowing material dispensed from the dispensing nozzle.

In a further aspect of the disclosure, the channel may be substantially uniform diameter.

In a further aspect of the disclosure, the dispensing nozzle may comprise a protective collar. The protective collar may define an opening. The protective collar may have a longitudinal length. The longitudinal length of the protective collar may be greater than a longitudinal length of a portion of the wall that defines the channel.

In a further aspect of the disclosure, the protective collar may define an opening positioned underneath and aligned with the outlet opening defined by the conical outlet of the ultrasound emitter.

In a further aspect of the disclosure, the protective collar may comprise a portion having an upper section and a lower section, the protective collar tapering from the upper section to the lower section.

In another aspect of the disclosure, a dispensing nozzle having an ultrasound emitter may be provided, and the dispensing nozzle may have more than one inlet. The ultrasound emitter may include a wall that defines a channel. The ultrasound emitter may have at least a first inlet at a first side of the ultrasound emitter and at least a second inlet at a second side of the ultrasound emitter. The ultrasound emitter may also have a top and a bottom, wherein the bottom of the ultrasound emitter has a conical outlet. In an embodiment, the conical outlet may have an outer diameter that decreases in size in a direction towards an outlet opening defined by the conical outlet. The channel may extend from each of the at least first inlet and the at least second inlet of the ultrasound emitter to the conical outlet. The dispensing nozzle may further comprise a first tube, the first tube configured to deliver free-flowing material to the at least first inlet of the ultrasound emitter, and a second tube, the second tube configured to deliver a free-flowing material to the at least second inlet of the ultrasound emitter. The ultrasound emitter may be configured to deliver ultrasound waves to the free-flowing material flowing through channel.

In a further aspect of the disclosure, the dispensing nozzle may comprise an ultrasound transducer. The ultrasound transducer may be configured to generate ultrasound waves. The ultrasound transducer may be coupled to the ultrasound emitter.

In a further aspect of the disclosure, the ultrasound transducer may be selected from the group consisting of a magnetostriction-based transducer and a piezoelectric ultrasound transducer.

In a further aspect of the disclosure, an opening defined by the inlet of the ultrasound emitter may be provided, wherein the opening is substantially perpendicular to an opening defined by the conical outlet of the ultrasound emitter.

In a further aspect of the disclosure, the inlet of the ultrasound emitter may be placed at a position that corresponds to a node of ultrasound waves delivered by the ultrasound emitter.

In a further aspect of the disclosure, the conical outlet of the ultrasound emitter may be placed at a position that corresponds to an anti-node of ultrasound waves delivered by the ultrasound emitter.

In a further aspect of the disclosure, the inlet of the ultrasound emitter is placed at a position that corresponds to a node of ultrasound waves delivered by the ultrasound emitter, and wherein the conical outlet of the ultrasound emitter is placed at a position that corresponds to an anti-node of ultrasound waves delivered by the ultrasound emitter.

In a further aspect of the disclosure, the ultrasound emitter may be configured to induce cavitation in a free-flowing material passing through the conical outlet, the cavitation sufficient to destroy microorganisms and reduce microbial contamination of the free-flowing material dispensed from the dispensing nozzle.

In a further aspect of the disclosure, the channel may be substantially uniform diameter.

In a further aspect of the disclosure, the dispensing nozzle may comprise a protective collar. The protective collar may define an opening. The protective collar may have a longitudinal length. The longitudinal length of the protective collar may be greater than a longitudinal length of a portion of the wall that defines the channel.

In a further aspect of the disclosure, the protective collar may define an opening positioned underneath and aligned with the outlet opening defined by the conical outlet of the ultrasound emitter.

In a further aspect of the disclosure, the protective collar may comprise a portion having an upper section and a lower section, the protective collar tapering from the upper section to the lower section.

In another aspect of the disclosure, a method is provided that comprises receiving free-flowing material at an inlet of an ultrasound emitter of a dispensing nozzle. The method comprises emitting ultrasound waves by the ultrasound emitter. The method comprises subjecting the free-flowing material to the ultrasound waves received in the ultrasound emitter. The subjecting may comprise subjecting the free-flowing material to the ultrasound waves at a node of the ultrasound waves and followed by subjecting the free-flowing food to the ultrasound waves at an anti-node of the ultrasound waves. The method may further comprise dispensing the free-flowing material through an outlet of the ultrasound emitter of the dispensing nozzle.

In a further aspect of the disclosure, in the above the method, the node of the ultrasound waves may be at the inlet of the ultrasound emitter of the dispensing nozzle.

In a further aspect of the disclosure, in the above the method, the anti-node of the ultrasound waves may be at the outlet of the ultrasound emitter of the dispensing nozzle.

In a further aspect of the disclosure, in the above the method, the node of the ultrasound waves may be at the inlet of the ultrasound emitter of the dispensing nozzle, and the anti-node of the ultrasound waves may be at the outlet of the ultrasound emitter of the dispensing nozzle.

In a further aspect of the disclosure, in the above the method, the free-flowing material comprises a food.

In a further aspect of the disclosure, in the above the method, the food comprises a beverage component.

As will be recognized by those skilled in the art, the above described embodiments may be configured to be compatible with fountain system requirements, and can accommodate a wide variety of fountain offerings, including but not limited beverages known under any PepsiCo branded name, such as Pepsi-Cola®, and custom beverage offerings. The embodiments described herein offer speed of service at least and fast or faster than conventional systems. The embodiments described herein may be configured to be monitored, including monitored remotely, with respect to operation and supply levels. The embodiments described herein are economically viable and can be constructed with off-the-shelf components, which may be modified in accordance with the disclosures herein.

Those of skill in the art will recognize that in accordance with the disclosure any of the features and/or options in one embodiment or example can be combined with any of the features and/or options of another embodiment or example.

The disclosure herein has been described and illustrated with reference to the embodiments of the figures, but it should be understood that the features of the disclosure are susceptible to modification, alteration, changes or substitution without departing significantly from the spirit of the disclosure. For example, the dimensions, number, size and shape of the various components may be altered to fit specific applications. Accordingly, the specific embodiments illustrated and described herein are for illustrative purposes only and the disclosure is not limited except by the following claims and their equivalents.

We claim:

1. A dispensing nozzle comprising:
 a substantially vertically oriented, elongated ultrasound emitter, the ultrasound emitter having a wall, the wall having an outside surface, an inside surface, and a thickness between the outside surface and the inside surface, the inner surface of the wall defining a channel, the ultrasound emitter having an inlet at a side of the ultrasound emitter, the wall of the ultrasound emitter having an upper portion and a lower portion, the lower portion of the wall having a conical outlet, wherein the conical outlet has an outer diameter that decreases in size in a downward direction towards an outlet opening defined by an outlet edge at a bottom of the conical outlet, wherein the thickness of the lower portion of the wall reduces at a rate that is non-exponential and in a direction towards the outlet edge, the channel extending from the inlet to the outlet edge of the conical outlet, and a tube, the tube configured to deliver free-flowing food material to the side inlet of the ultrasound emitter, the tube comprising a substantially vertical portion, a substantially horizontal portion, and an elbow between the substantially vertical portion and the substantially horizontal portion, wherein the substantially horizontal portion is attached to a horizontal surface of the side inlet at an end opposite the elbow, wherein the side inlet is placed at a position on the ultrasound emitter that corresponds to a node of ultrasound waves delivered by the ultrasound emitter, and wherein the conical outlet is placed at a position that corresponds to an anti-node of ultrasound waves delivered by the ultrasound emitter, the ultrasound emitter configured to deliver ultrasound waves to free-flowing food material flowing through the channel.

2. The dispensing nozzle of claim 1, further comprising an ultrasound transducer, the ultrasound transducer configured to generate ultrasound waves, the ultrasound transducer coupled to the ultrasound emitter.

3. The dispensing nozzle of claim 2, wherein the ultrasound transducer is selected from the group consisting of a magnetostriction-based transducer and a piezoelectric ultrasound transducer.

4. The dispensing nozzle of claim 1, wherein an opening defined by the inlet of the ultrasound emitter is substantially perpendicular to an opening defined by the conical outlet of the ultrasound emitter.

5. The dispensing nozzle of claim 1, wherein the ultrasound emitter is configured to induce cavitation in a free-flowing food material passing through the conical outlet, the cavitation sufficient to destroy microorganisms and reduce microbial contamination of the free-flowing food material dispensed from the dispensing nozzle.

6. The dispensing nozzle of claim 1, wherein the channel has a substantially uniform diameter.

7. The dispensing nozzle of claim 1 further comprising a protective collar, the protective collar defining an opening, the protective collar having a longitudinal length, the longitudinal length of the protective collar being greater than a longitudinal length of a portion of the wall that defines the channel.

8. The dispensing nozzle of claim 7, wherein the protective collar defines an opening positioned underneath and aligned with the outlet opening defined by the conical outlet of the ultrasound emitter.

9. The dispensing nozzle of claim 8, wherein the protective collar has a portion having an upper section and a lower section, the protective collar tapering from the upper section to the lower section.

10. A dispensing nozzle comprising:
a substantially vertically oriented, elongated ultrasound emitter, the ultrasound emitter having a wall having an outside surface, an inside surface, and a thickness between the outside surface and the inside surface, the inner surface of the wall defining a channel, the ultrasound emitter having at least a first side inlet at a first side of the ultrasound emitter and at least a second side inlet at a second side of the ultrasound emitter, the wall of the ultrasound emitter having an upper portion and a lower portion, the lower portion of the wall having a conical outlet, wherein the conical outlet has an outer diameter that decreases in size in a downward direction towards an outlet opening defined by an outlet edge at a bottom of the conical outlet, wherein the thickness of the lower portion of the wall reduces at a rate that is non-exponential and in a direction towards the outlet edge, the channel extending from each of the at least first side inlet and the at least second side inlet to the outlet edge of the conical outlet, a first tube, the first tube configured to deliver free-flowing food material to the at least first side inlet of the ultrasound emitter, the first tube comprising a substantially vertical portion, a substantially horizontal portion, and an elbow between the substantially vertical portion and the substantially horizontal portion, wherein the substantially horizontal portion of the first tube is attached to a horizontal surface of the first side inlet at an end opposite the elbow of the first tube, a second tube, the second tube configured to deliver free-flowing food material to the at least second side inlet of the ultrasound emitter, the second tube comprising a substantially vertical portion, a substantially horizontal portion, and an elbow between the substantially vertical portion and the substantially horizontal portion of the second tube, wherein the substantially horizontal portion of the second tube is attached to a horizontal surface of the second side inlet at an end opposite the elbow of the second tube, wherein the at least first inlet and the at least second inlet are each placed at a position on the ultrasound emitter that corresponds to a node of ultrasound waves delivered by the ultrasound emitter, and wherein the conical outlet is placed at a position that corresponds to an anti-node of ultrasound waves delivered by the ultrasound emitter, the ultrasound emitter configured to deliver ultrasound waves to free-flowing food material flowing through the channel.

11. The dispensing nozzle of claim 10, further comprising an ultrasound transducer, the ultrasound transducer configured to generate ultrasound waves, the ultrasound transducer coupled to the ultrasound emitter.

12. The dispensing nozzle of claim 11, wherein the ultrasound transducer is selected from the group consisting of a magnetostriction-based transducer and a piezoelectric ultrasound transducer.

13. The dispensing nozzle of claim 10, wherein an opening defined by the at least first inlet and an opening defined by the at least second inlet of the ultrasound emitter are each substantially perpendicular to an opening defined by the conical outlet of the ultrasound emitter.

14. The dispensing nozzle of claim 10, wherein the ultrasound emitter is configured to induce cavitation in free-flowing food material passing through the conical outlet, the cavitation sufficient to destroy microorganisms and reduce microbial contamination of the free-flowing food material dispensed from the dispensing nozzle.

15. The dispensing nozzle of claim 10, wherein the channel has a substantially uniform diameter.

16. The dispensing nozzle of claim 10 further comprising a protective collar, the protective collar defining an opening, the protective collar having a longitudinal length, the longitudinal length of the protective collar being greater than a longitudinal length of a portion of the wall that defines the channel.

17. The dispensing nozzle of claim 16, wherein the protective collar defines an opening positioned underneath and aligned with the outlet opening defined by the conical outlet of the ultrasound emitter.

18. The dispensing nozzle of claim 17, wherein the protective collar has a portion having an upper section and a lower section, the protective collar tapering from the upper section to the lower section.

* * * * *

UNITED STATES PATENT AND TRADEMARK OFFICE
CERTIFICATE OF CORRECTION

PATENT NO. : 9,565,870 B2
APPLICATION NO. : 13/664628
DATED : February 14, 2017
INVENTOR(S) : Deo et al.

It is certified that error appears in the above-identified patent and that said Letters Patent is hereby corrected as shown below:

On the Title Page

In Item (72) Inventors, delete "Vladmir" and insert --Vladimir--, therefor.

In the Claims

In Column 8, Line 26, Claim 10, delete "tube," and insert --tube, and--, therefor.

Signed and Sealed this
Twenty-fourth Day of April, 2018

Andrei Iancu
*Director of the United States Patent and Trademark Office*